(12) United States Patent
Rast

(10) Patent No.: US 8,939,105 B1
(45) Date of Patent: Jan. 27, 2015

(54) OCEANIC PLATFORM TO EXTRACT AND DISCHARGE SALT WATER

(71) Applicant: Sean David Rast, Dallas, TX (US)

(72) Inventor: Sean David Rast, Dallas, TX (US)

( * ) Notice: Subject to any disclaimer, the term of this patent is extended or adjusted under 35 U.S.C. 154(b) by 31 days.

(21) Appl. No.: 13/926,429

(22) Filed: Jun. 25, 2013

Related U.S. Application Data

(60) Provisional application No. 61/664,650, filed on Jun. 26, 2012.

(51) Int. Cl.
*B63B 35/44* (2006.01)
*A01G 15/00* (2006.01)

(52) U.S. Cl.
CPC ....................................... *A01G 15/00* (2013.01)
USPC ...................................... 114/264; 210/170.11

(58) Field of Classification Search
USPC ............. 114/264; 210/170.11, 177, 181, 182, 210/188; 203/10
See application file for complete search history.

(56) References Cited

U.S. PATENT DOCUMENTS

| | | | | |
|---|---|---|---|---|
| 3,802,673 A | * | 4/1974 | Ross | 114/264 |
| 5,582,691 A | * | 12/1996 | Flynn et al. | 203/11 |
| 6,673,249 B2 | * | 1/2004 | Max | 210/170.11 |
| 6,830,682 B2 | * | 12/2004 | Max | 210/170.11 |

* cited by examiner

*Primary Examiner* — Lars A Olson

(74) *Attorney, Agent, or Firm* — Plager Schack LLP

(57) ABSTRACT

An oceanic platform is configured to discharge water into an atmosphere to create rain and thus more fresh water. The oceanic platform comprises a floating platform mechanically coupled to a deck grate. The deck grate is further mechanically coupled to a telescoping shaft. The telescoping shaft is mechanically coupled to a water intake. A pump can push the water through the water intake up the telescoping shaft and into the atmosphere, thus creating the rain and more of the fresh water.

7 Claims, 4 Drawing Sheets

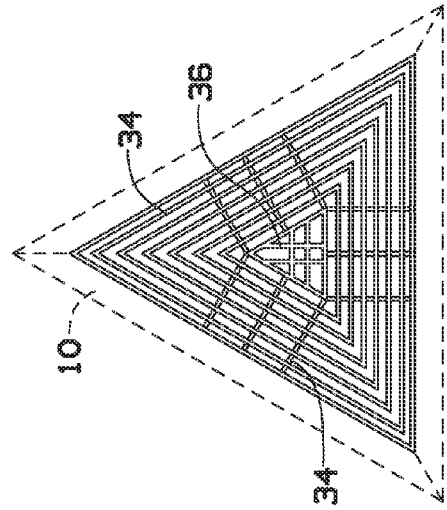
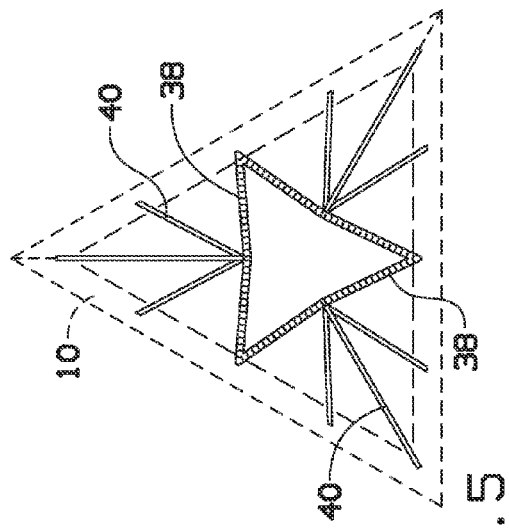
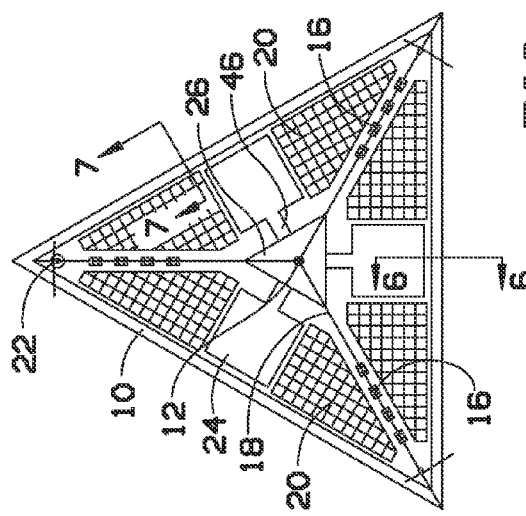

OCEANIC PLATFORM TO EXTRACT AND DISCHARGE SALT WATER

RELATED APPLICATION

This application claims priority to provisional patent application U.S. Ser. No. 61/664,650 filed on Jun. 26, 2012, the entire contents of which is herein incorporated by reference.

BACKGROUND

The embodiments herein relate generally to devices that can move seawater.

The water cycle describes the continuous movement of water on, above and below the surface of the Earth. Although the balance of water on Earth remains fairly constant over time, individual water molecules can come and go, in and out of the atmosphere. The water moves from one reservoir to another, such as from river to ocean, or from the ocean to the atmosphere, by the physical processes of evaporation, condensation, precipitation, infiltration, runoff, and subsurface flow. In so doing, the water goes through different phases: liquid, solid (ice), and gas (vapor).

Prior to the disclosed invention, desalination of saltwater was accomplished, primarily by a multi-stage flash desalinator that used a combination of heat and vacuum to boil fresh water from salt water. In recent years, varieties of a reverse osmosis system have been used to desalinate water on a small scale. However, neither has done much to remedy the problem of a lack of fresh water.

Embodiments of the present invention solve this problem in a new way, rather than trying to make a direct change in state with a machine, embodiments of the present invention puts energy into the water cycle to help natural processes for creating additional freshwater by moving water from the ocean into the freshwater portions of the water cycle.

SUMMARY

An oceanic platform is configured to discharge water into an atmosphere to create rain and thus more fresh water. The oceanic platform comprises a floating platform mechanically coupled to a deck grate. The deck grate is further mechanically coupled to a telescoping shaft. The telescoping shaft is mechanically coupled to a water intake. A pump can push the water through the water intake up the telescoping shaft and into the atmosphere, thus creating the rain and more of the fresh water.

In some embodiments, the deck grate is reinforced by a floor support beams and a center shaft beam assembly. The floor support beams and the center shaft beam assembly are further supported by a triangle truss and a straight truss.

In some embodiments, the telescoping shaft can be raised and lowered by hydraulic pistons and can receive stability guy wires where each guy wire is mechanically coupled to a reel. The telescoping shaft is controlled by a control room mechanically coupled to the deck grate. The control room is powered by lithium ion battery towers. The lithium ion battery towers can be charged by solar panels and wind turbines.

BRIEF DESCRIPTION OF THE FIGURES

The detailed description of some embodiments of the invention is made below with reference to the accompanying figures, wherein like numerals represent corresponding parts of the figures.

FIG. 3 is a top view of an embodiment of the invention.

FIG. 4 is a top view of an embodiment of the sub-floor and center shaft support structure.

FIG. 5 is a top view of an embodiment of the platform base truss structure.

DETAILED DESCRIPTION OF CERTAIN EMBODIMENTS

Figure 1:
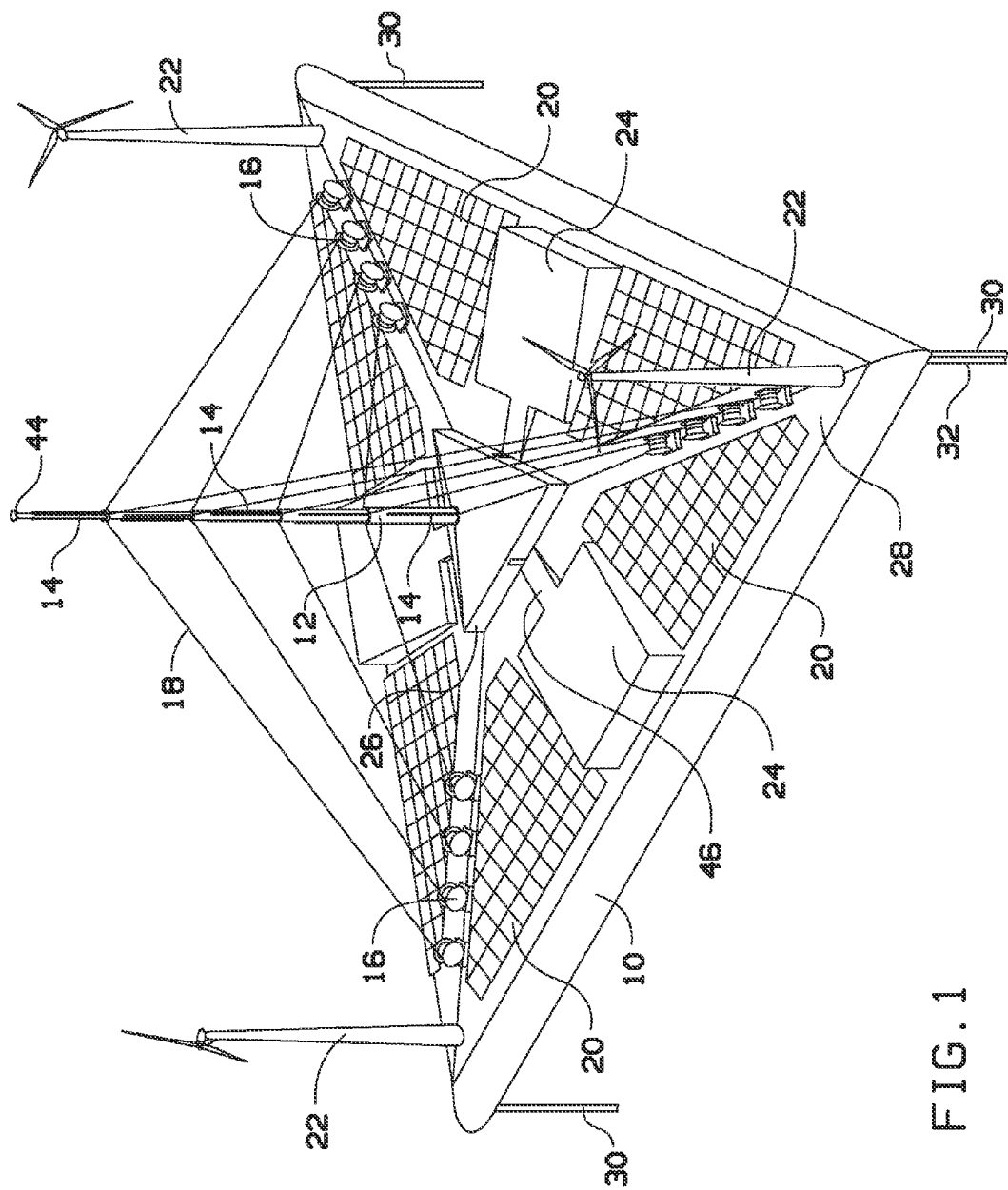
FIG. 1 is a perspective view of an embodiment of the invention.

By way of example, and referring to FIG. 1, one embodiment of the present system comprises floating platform 10 mechanically coupled to telescoping shaft 12 with hydraulic pistons 14 which are capable of expanding and contracting telescoping shaft 12. Floating platform 10 is further mechanically coupled to deck grate 28.

Deck grate 28 is mechanically coupled to reels 16. Reels 16 are mechanically coupled to telescoping shaft 12 with guy wires 18. In some embodiments, telescoping shaft 12 can be made from titanium. Deck grate 28 is further mechanically coupled to solar panels 20 and wind turbines 22 which can provide electrical power which can be stored in batteries such as lithium ion battery towers for use in operating electrical and mechanical components. Deck grate 28 is further mechanically coupled to three helipads 24 which can accommodate helicopters that ferry people to and from floating platform 10. Helipads 24 are mechanically coupled to control house 26 by walkways 46. Control house 26 can utilize a satellite global positioning system and a programmer to ensure proper location.

In this embodiment, floating platform 10 is mechanically coupled to anchor lines 30 and ground wire 32. Anchor lines 30 and ground wire 32 can be used to tether floating platform 10 to a seabed or ocean floor.

Figure 2:
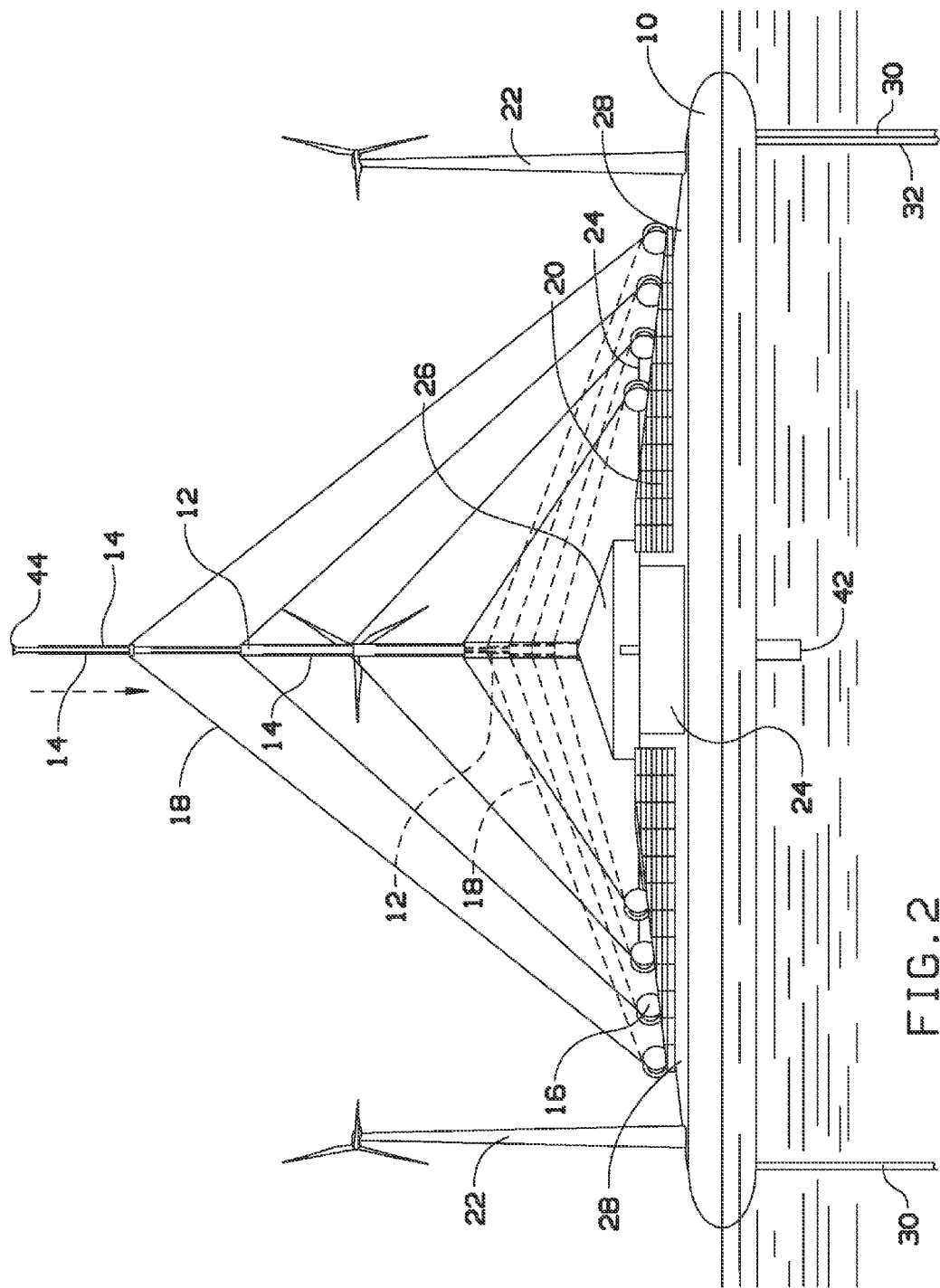
FIG. 2 is a front view of an embodiment of the invention, illustrating the movement of the telescoping shaft.

Turning to FIG. 2, a user can utilize hydraulic pistons 12 and guy wires 18 to raise and lower telescoping shaft 12. When telescoping shaft 12 is raised a user can pump sea water through water intake 42 with pumps that discharge water through water spout 44 into the sky. Once elevated the water can enter the atmosphere and return as fresh water rain, with the water cycle acting as a natural filter. In some embodiments an electromagnetic turbine and primer pumps are utilized to start the pumping process. When dangerous weather or other conditions approach, telescoping shaft 12 can be lowered to lower the center of gravity of the oceanic platform.

FIG. 3, FIG. 4 and FIG. 5 provide one theory of how to make the oceanic platform. Turning to FIG. 5, a user can bisect each leg of the triangle comprising floating platform 10 with and edge of triangle truss 38. The corners of floating platform 10 can be mechanically coupled to straight truss 40 which has an arrow shape with two arms. Each arm bisects floating platform 10 between a floating platform 10 corner and a triangle truss 38 corner. In some embodiments, floating platform 10 is made of aluminum to resist rust in the ocean. Zinc annodes can also be utilized to reduce rust.

Figure 7:
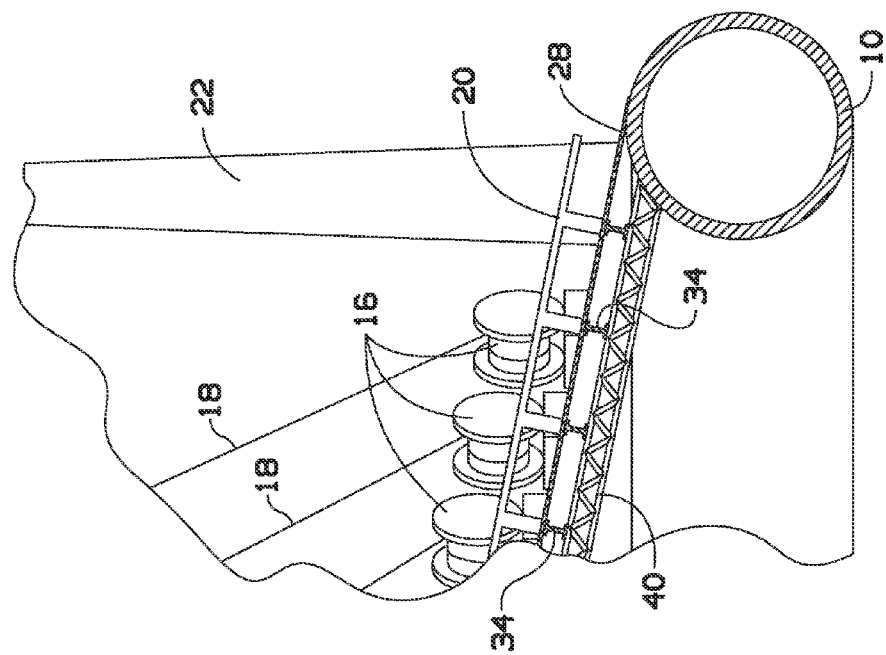
FIG. 7 is a section view of an embodiment of the invention, taken along line 7-7 in FIG. 3.
Figure 6:
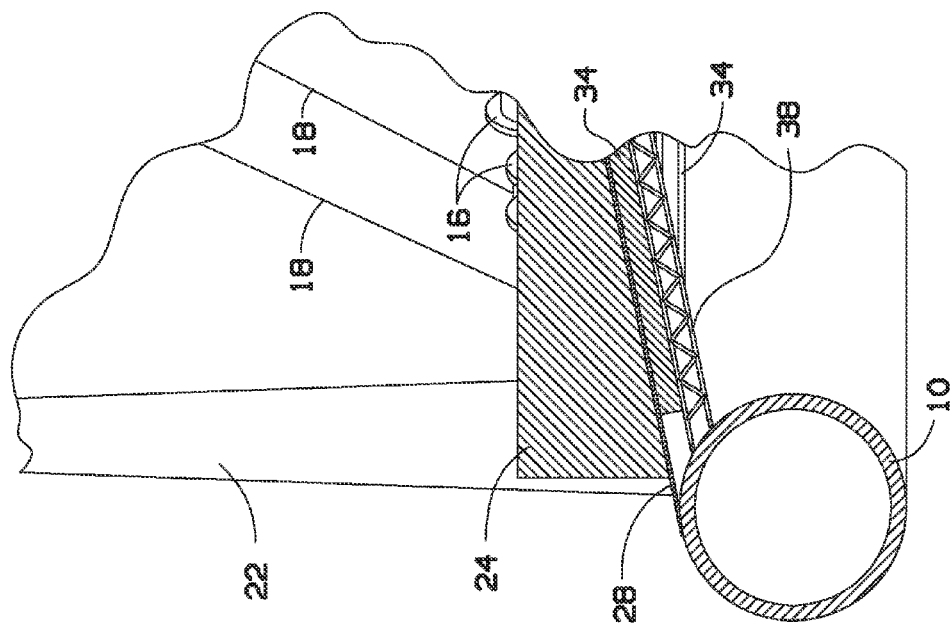
FIG. 6 is a section view of an embodiment of the invention, taken along line 6-6 in FIG. 3.

Turning to FIG. 4, FIG. 6 and FIG. 7, triangle truss 38 and straight truss 40 are covered with center shaft beam assembly 36 surrounded by floor support beams 34. Both center shaft beam assembly 36 and floor support beams 34 have a concentric triangle shape in this embodiment.

Turning to FIG. 3, floor support beams 34 are mechanically coupled to deck grate 28. Deck grate 28 is further mechanically coupled to reels 16, helipads 24, walkways 46, control room 24 and solar panels 20 as noted above.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An oceanic platform, configured to discharge water into an atmosphere to create rain and thus more fresh water, the oceanic platform comprising,
   a floating platform mechanically coupled to a deck grate;
   the deck grate is further mechanically coupled to a telescoping shaft;
   the telescoping shaft is mechanically coupled to a water intake;
   wherein a pump can push the water through the water intake up the telescoping shaft and into the atmosphere, thus creating the rain and more of the fresh water.

2. The oceanic platform of claim 1, wherein the deck grate is reinforced by a floor support beams and a center shaft beam assembly.

3. The oceanic platform of claim 1, wherein the deck grate is reinforced by a floor support beams and a center shaft beam assembly; wherein the floor support beams and the center shaft beam assembly are further supported by a triangle truss and a straight truss.

4. The oceanic platform of claim 1, wherein the telescoping shaft can be raised and lowered by hydraulic pistons and can receive stability guy wires where each guy wire is mechanically coupled to a reel.

5. The oceanic platform of claim 1, wherein the telescoping shaft can be raised and lowered by hydraulic pistons and can receive stability guy wires where each guy wire is mechanically coupled to a reel; wherein the telescoping shaft is controlled by a control room mechanically coupled to the deck grate.

6. The oceanic platform of claim 1, wherein the telescoping shaft can be raised and lowered by hydraulic pistons and can receive stability guy wires where each guy wire is mechanically coupled to a reel; wherein the telescoping shaft is controlled by a control room mechanically coupled to the deck grate; wherein the control room is powered by lithium ion battery towers.

7. The oceanic platform of claim 1, wherein the telescoping shaft can be raised and lowered by hydraulic pistons and can receive stability guy wires where each guy wire is mechanically coupled to a reel; wherein the telescoping shaft is controlled by a control room mechanically coupled to the deck grate; wherein the control room is powered by lithium ion battery towers; and where the lithium ion battery towers can be charged by solar panels and wind turbines.

* * * * *